Nov. 11, 1969  E. V. SUESS  3,477,492
FOLDING GUARD SCREEN ASSEMBLY
Filed July 10, 1967
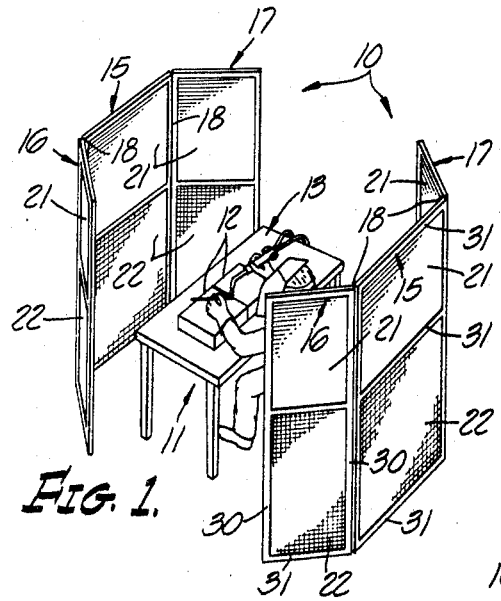
FIG. 1.
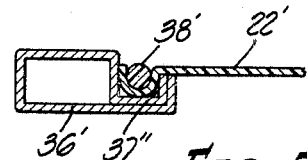
FIG. 5.
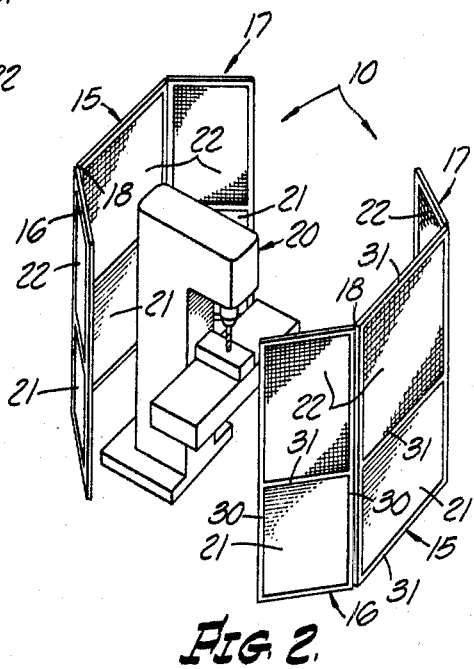
FIG. 2.
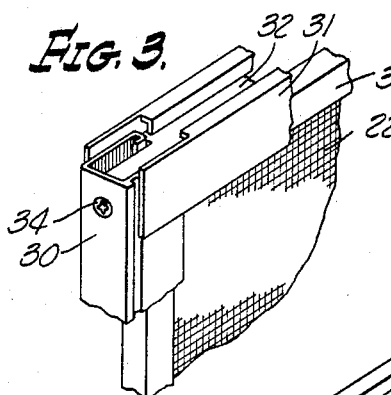
FIG. 3.
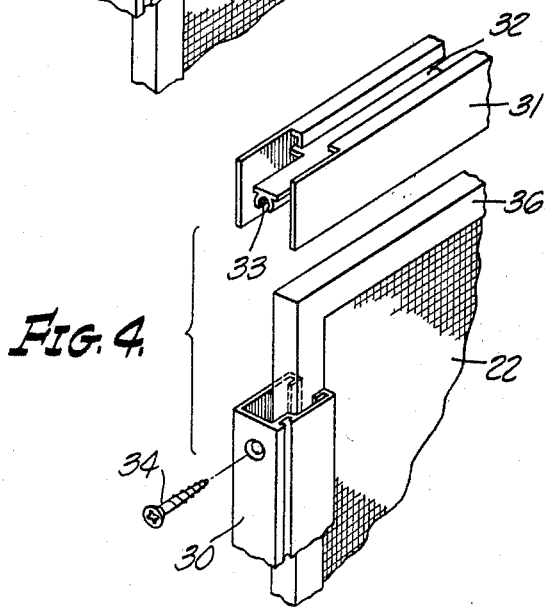
FIG. 4.
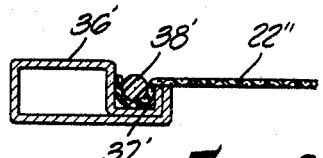
FIG. 6.
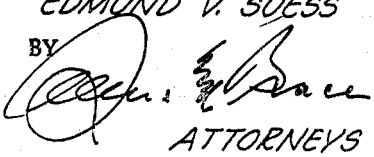
INVENTOR
EDMUND V. SUESS
BY
ATTORNEYS United States Patent Office 3,477,492
Patented Nov. 11, 1969

3,477,492
FOLDING GUARD SCREEN ASSEMBLY
Edmund V. Suess, 19127 Prairie St.,
Northridge, Calif. 91324
Filed July 10, 1967, Ser. No. 652,246
Int. Cl. A47g 5/00
U.S. Cl. 160—135
1 Claim

ABSTRACT OF THE DISCLOSURE

A portable and convertible industrial safety guard assembly for use about welders, electrical equipment, machinery and the like to safeguard personnel in the vicinity against injury from electric arcs, flying chips, harmful fluids, electric sparks and the like hazards without interfering with essential ventilation and air supply. The guard assembly is readily moved from place to place to suit the user's needs and additionally serves to conceal confidential operations from view by passersby. The various panels are readily replaceable with panels of different construction and utility and enable a user to meet a variety of widely varying needs with a minimum investment in guard equipment.

---

This invention relates to a versatile folding guard screen assembly designed for expeditious conversion to a wide variety of industrial uses, as for example, about various types of manufacturing and assembly operations and comprising three rectangular frames hinged together along their adjacent lateral ledges. Each frame is divided into two main panel sections at least one of which is readily removable and replaceable by a panel section of different construction and one of which panel sections is preferably imperforate. Typically the detachable panel sections are held in place by a removable end rail. The several replaceable panel sections are fabricated differently to meet different industrial needs. Typically, one of the sections may be covered by fine screening providing excellent protection against flying chips from a machining operation and the escape of molten spatter from a welding operation while permitting free circulation of air through the screen. Another panel section may be covered with transparent plastic or the like effective to provide a barrier against the passage of machine tool chips, coolant liquid, hydraulic fluids and the like while permitting a clear view from the far side of the screen of operations in progress on the other side. Still other panels may be covered with translucent material permitting passage of light but obscuring the view of operations being conducted behind the screen and avoiding distraction of a workman by passersby. According to another mode of use the screen assembly can be inverted with the opaque panels uppermost and cutting off a direct view by passersby of welding operations likely to injure the optic nerve while not interfering with essential circulation of air through the lower reticulated panel sections. The screen being completely self-supporting it is adapted to be shifted into and out of any desired operating position and enables closely spaced working stations to be manned without interference and without distracting the attention of workmen at these stations.

The highly versatile screen assembly provided by this invention is particularly suitable for use in laboratory and industrial operations to provide protection, security and to comply with various operational and safety practice requirements. The folding convertible screen assembly can be placed as desired about an operating environment and requires no mounting brackets, braces or other installation equipment since it is self-supporting in any of numerous unfolded positions. The assembly is particularly useful between closely spaced working stations or along passageways leading past working stations and frequented by persons likely to be injured or have their clothing damaged by flying chips, sparks, cutting fluids and the like hazards. Classified operations are also readily shielded from view by unauthorized persons.

Accordingly, it is a primary object of the invention to provide a highly versatile convertible guard screen assembly particularly suitable for use in a wide variety of ways in different industrial operations.

Another object of the invention is the provision of a workman's guard screen assembly selectively usable with either end uppermost and having panels at one end half of imperforate material and the panels at the other end half of perforated material.

These and other more specific objects will appear upon reading the following specification and claims and upon considering in connection therewith the attached drawing to which they relate.

Referring now to the drawing in which a preferred embodiment of the invention is illustrated.

FIGURE 1 is a perspective view showing a pair of the invention guard screens suitably disposed about a welding station;

FIGURE 2 is a view similar to FIGURE 1 but showing the screens suitably arranged about a machine tool and inverted to an alternate position;

FIGURE 3 is a fragmentary view on enlarged scale through one corner of one of the assembly frames in fully assembled position;

FIGURE 4 is a view similar to FIGURE 3 but showing the parts in partially exploded position; and FIGURES 5 and 6 are cross-sectional views on enlarged scale taken through two differently constructed panel sections.

Referring initially more particularly to FIGURE 1, there is shown a typical embodiment of the invention screen assembly designated generally 10 and there shown as used in pairs about a workbench 11 supporting parts 12, 12 being welded together with any suitable form of welding equipment 13. The convertible screen assembly 10 includes three rectangular frames including a relatively large central frame 15 and a pair of narrower side frames 16, 17. The side frames 16, 17 are suitably hinged at 18 to the opposite sides of central frame 15, the hinging being so arranged that the side frames will collapse and fold against the central panel for compact storage and handling. The imperforate panels 21 located in the upper halves of each frame are located generally at eye level and prevent passersby from obtaining a direct view of the high temperature welding operation. This is highly important in protecting the optic nerves against injury from these high temperatures.

Referring next to FIGURE 2, it will be understood that guard screens 10, 10 are suitably arranged about a machine tool 20. However, each of the guard assemblies is inverted from the position shown in FIGURE 1 in order that the imperforate panels 21 are located near the floor rather than at the upper ends of the assemblies as they are in the FIGURE 1 mode of use. In FIGURE 1 the lower halves of each of the frames is fitted with mesh panels 22 providing for the free circulation of air about the welding station while safeguarding against molten spatter and sparks from the welding operation passing outwardly through the screen thereby avoiding injury to passersby and to material on the outer sides of the screen. However, in FIGURE 2 the upper half of each guard assembly is covered by screen mesh coated with translucent plastic or the like. Such panels permit light to enter on all sides of the operating station but prevent a view of the work in progress by passersby and other unauthorized persons. This material also serves to screen the operator from the view of the surrounding area thereby avoiding distracting his attention.

As will be appreciated from FIGURES 1 and 2, each of the guard screen assemblies is self-supporting by its own weight and is adapted to be readily shifted to any desired position relative to the working station. While not so shown, it will also be understood that additional screen assemblies may be erected crosswise of the gap between the pair of screens illustrated thereby providing full security and protection.

Referring now more particularly to FIGURES 3 and 4, it will be understood that each of the frames 15, 16 and 17 is of similar construction. Each is formed from lengths of extruded channeling 30, there being a pair of upright channel members 30 along either side interconnected by three horizontally disposed H-shaped rail members 31. Each of these rails has a channel opening outwardly from the opposite sides of its cross-member 32 to provide a groove for receiving and seating the edge of a panel section. Webs 32 are formed at their opposite ends with bores 33 sized to receive and interlock with the threads of a self-tapping screw 34.

The permanently installed imperforate panel sections 21 may be formed of any suitable material of either a metallic or non-metallic nature. The edges of sections 21 preferably are embraced by U-shaped vinyl glazing channel and snugly assembled within the channel of frame members 30 in a manner well known to workers in the window screen art. The side frames 30, 30 and cross rails 31, 31 are then held rigidly assembled by the self-tapping screws 34.

The other end half of each of the frames slidably seats frame 36 of one of the several converter panel sections 22. The frames of these panel sections are best shown in FIGURES 5 and 6. Each includes a groove, as 37', in which the covering material 22' is tightly wedged by resilient packing material 38'. Frames 36 are sized to have a close sliding fit in channel members 30, 30 and the corresponding seating grooves of cross rails 31.

In view of the foregoing, it will be apparent that the convertible panels 22 can be readily substituted one for the other simply by removing screws 34 and lifting away the outer cross rail 31 permitting the installed panel section 22 to be withdrawn and a different one installed in its place. Thereafter, the cross rail is re-assembled.

As shown in FIGURES 3 and 4, the covering material for the panel section comprises fine wire or plastic mesh freely admitting air but preventing chips or sparks from passing. FIGURE 5 shows an alternate panel section wherein the screening is replaced with transparent sheet plastic 22'. FIGURE 6, on the other hand, shows still another converter panel wherein the covering material comprises wire screen coated with a translucent plastic 22". This material has relatively great strength and readily passes light but obscures a view of operations on the other side. It also prevents the passage of liquids such as machine tool cutting fluids, hydraulic liquids and the like.

While the particular folding guard screen assembly herein shown and disclosed in detail is fully capable of attaining the objects and providing the advantages hereinbefore stated, it is to be understood that it is merely illustrative of the presently preferred embodiment of the invention and that no limitations are intended to the details of construction or design herein shown other than as defined in the append claims.

I claim:
1. An industrial self-supporting convertible safety guard assembly for use in shops, factories and the like and adapted to be supported selectively in any of a wide variety of positions about machines, welders and the like, said guard assembly including a central metallic main frame and a pair of metallic side frames hinged to the opposite sides thereof and foldable between a collapsed position against said metallic main frame and different open positions lying at an angle to said metallic main frame, each of said frames supporting a pair of separate panel sections mutually cooperating to substantially fill the space bordered by a respective one of said frames, said safety guard assembly being readily invertable and each of said frames having means for converting the safety guard assembly to different uses including means for detachably securing at least one of said panel sections for each frame in place at one end thereof, and a plurality of differently constructed panel sections each sized to be secured in place in a respective one of said frame at the users option and each constructed to serve a different function and purpose, one of said sections in each of said frames is permanently assembled thereto, located in and covers substantially the upper half of the associated frame, the said upper panel sections being imperforate and opaque and effective to both bar the circulation of air and liquids therepast and to prevent passersby from eye injury through direct observation of a welding arc and thwarting a view to unauthorized passersby of confidential information shielded by the guard assembly, the lower halves of said frames are equipped with panel sections of reticulated material effective to provide air circulation for a welding operation when in progress behind said safety guard assembly while preventing welding sparks from escaping therepast.

References Cited

UNITED STATES PATENTS

| | | | |
|---|---|---|---|
| 328,342 | 10/1885 | Robinson | 160—135 X |
| 372,066 | 10/1887 | Greenman | 160—128 |
| 587,983 | 8/1897 | Martin | 160—180 X |
| 1,363,187 | 12/1920 | Miller | 160—135 X |
| 1,918,660 | 7/1933 | Norquist et al. | 160—353 |
| 2,606,608 | 8/1952 | Stewart | 160—371 |
| 2,938,248 | 5/1960 | Hadary | 160—351 X |

PETER M. CAUN, Primary Examiner

U.S. Cl. X.R.

160—351